Nov. 11, 1947.　　　W. A. GARRIGAN　　　2,430,765
REPAIR DEVICE FOR FLUSH TANKS
Filed Nov. 30, 1945

Inventor

William Agustine Garrigan

By Clarence A. O'Brien
and Harvey B. Jacobson
Attorneys

Patented Nov. 11, 1947

2,430,765

UNITED STATES PATENT OFFICE 2,430,765

REPAIR DEVICE FOR FLUSH TANKS

William Agustine Garrigan, Beaumont, Tex.

Application November 30, 1945, Serial No. 631,913

2 Claims. (Cl. 4—57)

This invention relates to flush tanks and has for a primary object to provide means whereby a leaky valve in such tank may be quickly and permanently repaired without interference with other fixtures in the tank.

Another object of the invention is to provide a renewable valve seat and valve actuating member.

Other features and advantages will become more readily apparent from the following description and the accompanying illustrative drawings in which.

Figure 1:
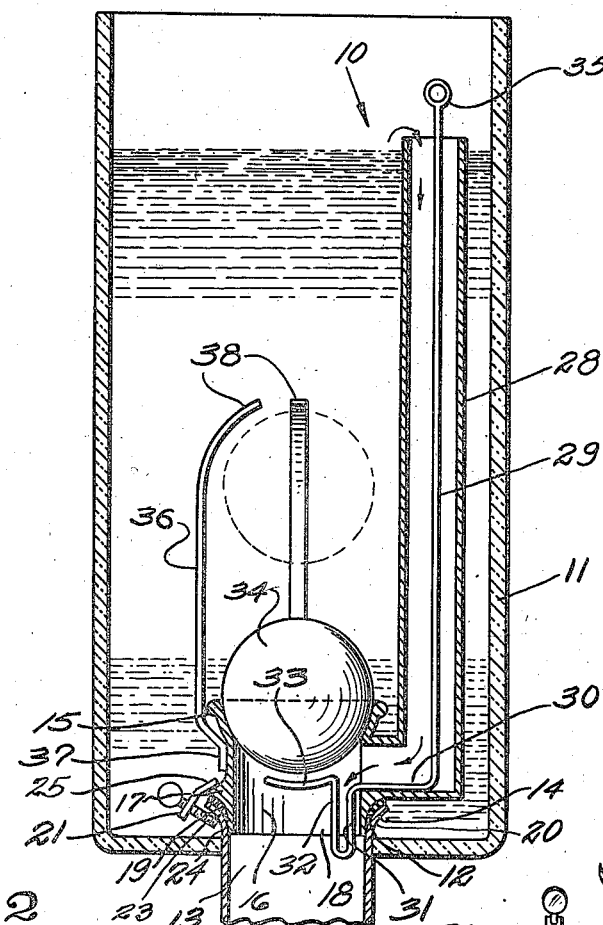
Figure 1 is a sectional view of a tank embracing my invention.
Figure 2:
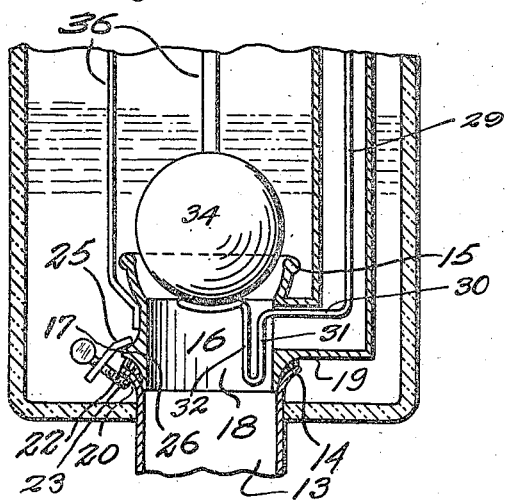
Figure 2 is a like view showing the parts in adjusted position.
Figure 3:
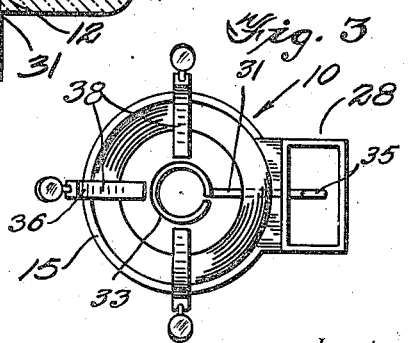
Figure 3 is a top plan view of the device.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claims. And while I have stated the primary field of utility of my invention it remains obvious that it may be employed in any other capacity wherein it may be found applicable.

In the accompanying drawings, and in the following specification, the same reference characters are used to designate the same parts and elements throughout and in which 10, refers to the invention in its entirety and 11, indicates a flush tank having an outlet 12, in which is the fixed pipe 13, and its seat 14, which seat often becomes rusty, pitted and worn otherwise preventing the ball valve from seating properly thereon causing leakage. Usually repairs to such a worn seat are very expensive due to the fact that it can not be gotten at without removing most of the other fixtures and appliances in the tank. The instant invention overcomes the difficulty and consists of an auxiliary seat 15, extending from a short pipe section 16, provided with an annular flange 17, above its lower end 18, which is adapted to project down into the pipe 13.

In the original seat 14, is placed a gasket 19, upon which the arcuate under side 20, of the flange 17, is adapted to seat. A series of clips 21, have bores through which set screws 22, project, the inner ends 23, of which bear upon the inclined wall 24, of the seat 14. The ends 25, of the clips engage the upper surface 26, of said flange 17, and by screwing down on the screws, the clips bind the member 16, upon the gasket 19, and seat 14.

Integrally connected to the pipe section 14, is the right-angular end 27, of a tube 28, through which operates a rod 29, the portion 30, of which is bent at right angles to extend into pipe 16, and is then bent down and returned to form a U-member 31, the arm 32, of which extends at right angles to provide a horizontal lift 33, for the ball valve 34. The upper end of rod 29, terminates in an eye 35, for connection with any lever or chain (not shown), whereby the same may be lifted to displace the ball 34, from its seat 15. A cage is formed around the ball 34, by upright arms 36, the lower ends 37, of which are fixed to the pipe 16, and the upper ends 38, curved over the ball 34, to prevent accidental displacement from its vertical position over its seat.

In order to repair the tank when its valve seat 14, is worn out it is only necessary to remove the ball therefrom, place the gasket 19, and fixture 16, and its connection (all of which are in a single unit) upon the old seat, fix the clips thereto and the job is completed.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

1. The described device comprising a valve repair unit attachable to an old valve seat, said unit comprising a new seat, a ball and lift means for the ball, a cage around the ball and secured to said seat, a pipe extending from the said seat and a tube projecting therefrom, said lift means operating in said tube, and means for detachably securing said seat to the old seat, said last mentioned means including a shoulder on said seat, straps secured to said shoulder and thumb screw means in said straps in abutting engagement with the flare of the old valve seat.

2. A replacement valve assembly for water closets comprising a conduit having a valve seat at one end thereof, a valve on said seat, a cage secured to said conduit around said valve, a pipe secured to said conduit, means for urging said valve from the seat in said pipe and said conduit, a shoulder on said conduit, straps secured to said shoulder extending therefrom, adjustable means extending through said straps for fixedly engaging an old valve seat.

WILLIAM AGUSTINE GARRIGAN.

REFERENCES CITED

The following references are of record in the file of this patent:

UNITED STATES PATENTS

| Number | Name | Date |
|---|---|---|
| 1,079,036 | Tosca et al. | Nov. 18, 1913 |
| 2,190,147 | Ciaccio et al. | Feb. 13, 1940 |